United States Patent [19]

Alexander

[11] 3,894,644

[45] July 15, 1975

[54] TRUCK-MOUNTED LOADER

[76] Inventor: Harold G. Alexander, Rt. 3, Box 3468, Troutdale, Oreg. 97060

[22] Filed: Dec. 26, 1973

[21] Appl. No.: 428,338

[52] U.S. Cl. ............... 214/505; 214/516; 267/136
[51] Int. Cl. ............................................. B60p 1/78
[58] Field of Search ........... 214/505, 508, 516, 517; 105/366 E; 296/35 A, 35 R; 267/136, 141; 89/44 R; 213/22, 23, 25

[56] References Cited
UNITED STATES PATENTS

| | | | |
|---|---|---|---|
| 1,080,979 | 12/1913 | Kanane | 213/22 |
| 2,348,019 | 5/1944 | Norbom | 214/516 |
| 3,049,378 | 8/1962 | Nelson | 214/517 |
| 3,144,149 | 8/1964 | Dempster | 214/516 |

FOREIGN PATENTS OR APPLICATIONS

| | | | |
|---|---|---|---|
| 682,665 | 6/1966 | Belgium | 214/506 |

*Primary Examiner*—Robert J. Spar
*Assistant Examiner*—Gary Auton
*Attorney, Agent, or Firm*—Kolisch, Hartwell, Dickinson & Stuart

[57] ABSTRACT

An improved truck-mounted loading/unloading assembly for a truck-carried detachable container. The assembly includes a tiltable container-supporting frame having a pair of laterally spaced frame members which form an elongate skidway for receiving and supporting the container, an elongate track disposed intermediate the frame members and extending substantially their length, a carriage mounted on the track for movement therealong, the carriage including a part adapted for coupling to the container, a power-operated chain drive system connected to the carriage for moving it back and forth along the track and a pair of shock-absorbing snubbers positioned laterally outward of the frame, adjacent its rear end, for engagement with a container as it moves into a seated, carrying position on the skidway.

7 Claims, 6 Drawing Figures

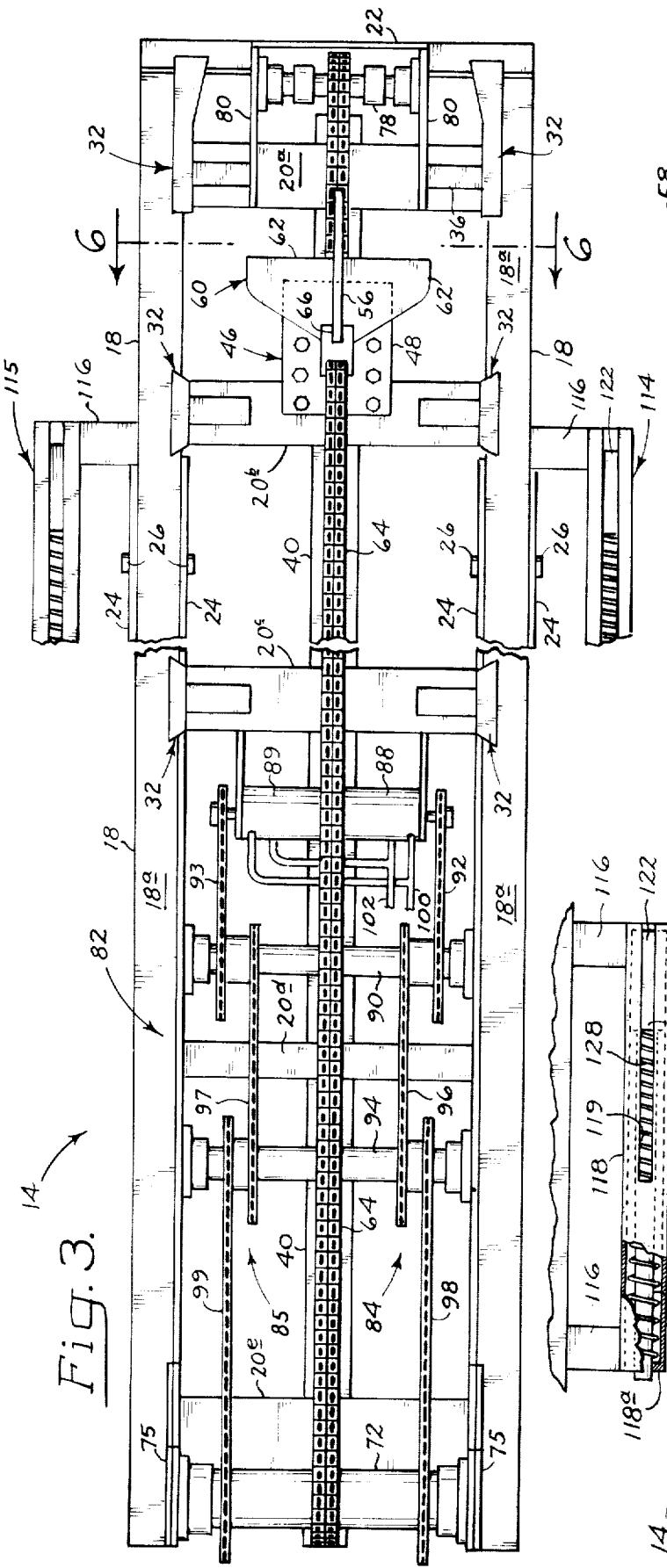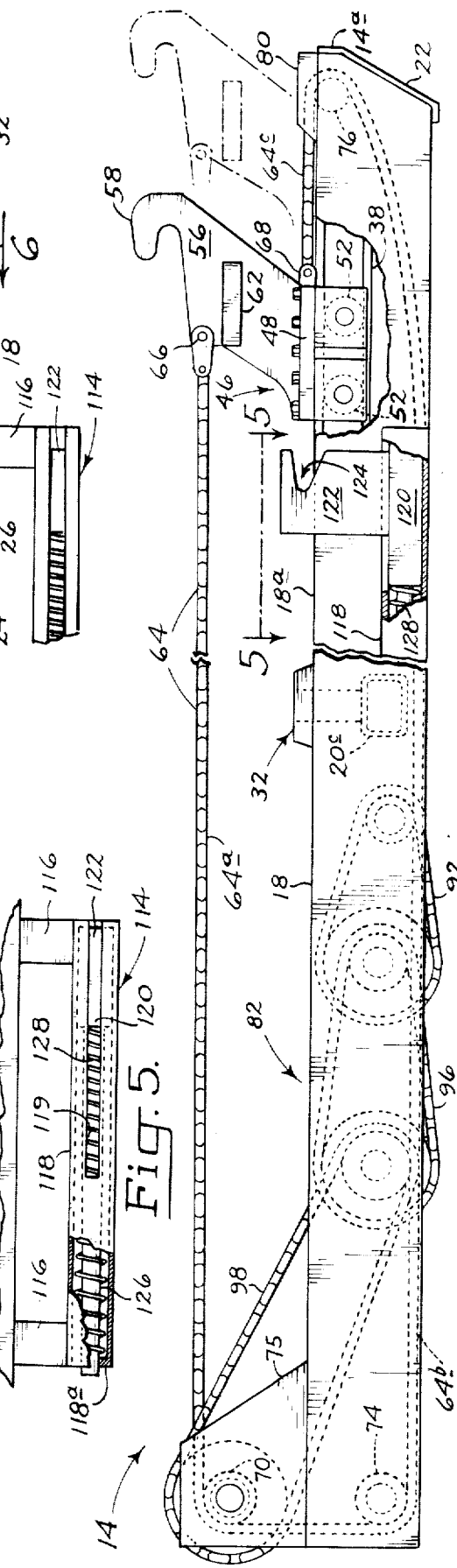

TRUCK-MOUNTED LOADER

BACKGROUND AND SUMMARY OF THE INVENTION

The present invention broadly relates to material-handling systems, and more particularly to truck-carried detachable container systems wherein the truck includes means for picking up the container for transportation by the truck, and for setting off the container at a desired destination. Still more particularly, the present invention relates to a truck and detachable container combination including an improved assembly for loading and unloading the container.

Truck-mounted loading/unloading assemblies for use with specially constructed detachable containers are well known and widely used. In one form, such an assembly includes a tiltable container-supporting frame having power-operated means thereon for on- or off-loading the container from the rear of the frame, as disclosed, for example, in U.S. Pat. No. 3,077,278, issued Feb. 12, 1963, to the applicant herein. Such prior art loading assemblies have a number of drawbacks, however.

Explaining, the detachable containers which enjoy the widest commercial usage are open top, box-like structures often referred to as "drop-off boxes". Typically, such a container includes means at one end for coupling to a truck's loading assembly, and a pair of bottom runners or skids on which the container is supported during on- and off-loading. In use, the container is transported to a desired location, off-loaded and left for some period of time during which it is filled, as with trash or waste material. In such service, the container is subject to a considerable amount of physical abuse, and to the effects of weather and moisture. As a result, the bottom surfaces of the runners are often rough and corroded.

A typical prior art loading/unloading assembly comprises a pair of laterally spaced rails or beams forming an elongate skidway. The container, supported on its runners, is moved along the skidway during loading or unloading by a power-operated cable reeving system, such as a winch, operatively connected to the container's coupling means. If the runners' bottom surfaces are rough or corroded, as is often the case, the container tends to move along the skidway in a jerky, stick-slip motion. This produces high instantaneous tension loads on the reeving system, which may result in failure of the cable. Moreover, such stick-slip motion may be aggravated by yieldable cable-tensioning devices which are a part of the reeving system. As will be appreciated, steel cables are somewhat elastic, and when breakage occurs under tension, persons nearby may be seriously injured or equipment badly damaged.

Some designs, such as that disclosed in the above-referenced U.S. Pat. No., have attempted to eliminate this problem by providing the tiltable frame with a series of rollers. In use, however, loading/unloading assemblies which employ rollers in place of a skidway have proven to be less durable and to require an inordinate amount of maintenance.

There is thus a need for a truck loading/unloading assembly which is safer, more durable and which requires less maintenance than prior art designs. Accordingly, it is a general object of the present invention to provide a loading/unloading assembly which is constructed to meet the above-identified need in a practical and satisfactory manner.

BRIEF DESCRIPTION OF THE DRAWINGS

The manner in which this and other objects and advantages of the present invention are attained, and the manner in which the novel truck loading/unloading assembly is constructed and operated, will be explained and described with reference to the accompanying drawings, wherein:

FIG. 3 is a shortened top plan view of the tiltable container-supporting frame, on a larger scale than FIGS. 1 and 2, taken on line 3—3 of FIG. 2 and shown removed from the truck;

FIG. 4 is a view taken from the bottom side of FIG. 3, with portions in this view broken away to illustrate details of construction;

FIG. 5 is a top plan view, with portions broken away, taken on line 5—5 of FIG. 4.

DESCRIPTION OF PREFERRED EMBODIMENT

Figure 1:
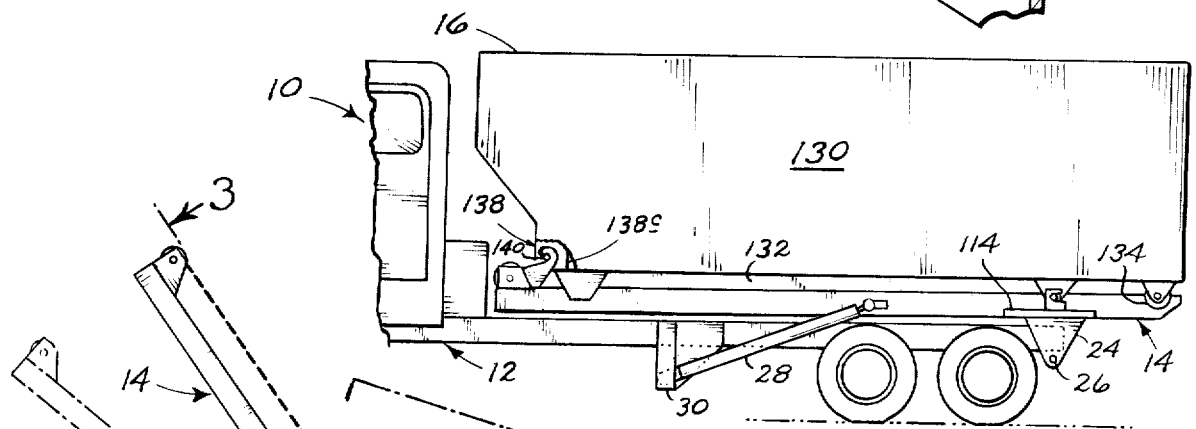
FIG. 1 is a simplified fragmentary side elevation showing a truck incorporating the improved loading/unloading assembly of the invention, with a container in the assembly in a fully loaded position on the truck.
Figure 2:
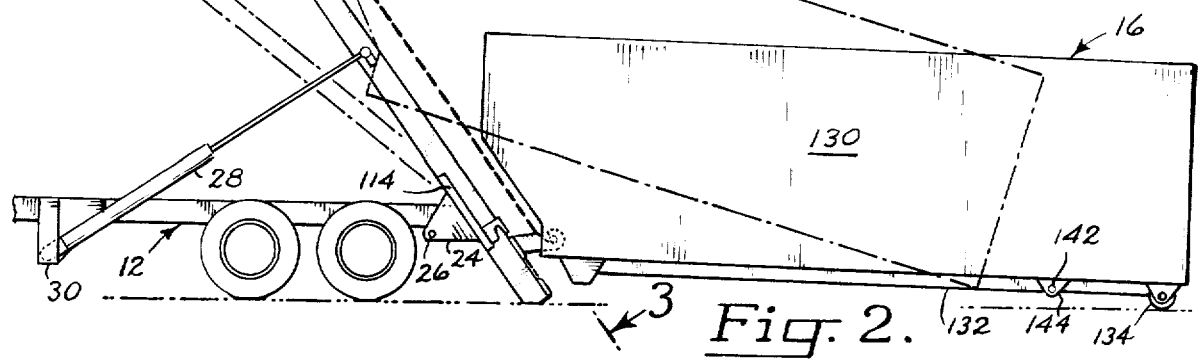
FIG. 2 is a similar elevation illustrating the container in the process of being loaded onto, or unloaded from, the truck.

Referring to the drawings in greater detail, a truck and detachable drop-box container embodying the present invention is shown in FIG. 1, with the truck indicated generally at 10. Truck 10 includes a body or chassis 12 mounting a tilt frame 14 on which is carried a detachable drop-box container 16, with the container being shown in FIG. 1 in a fully loaded, carrying position. Referring to FIGS. 3 and 4, tilt frame 14 includes a pair of main parallel longitudinal frame members 18 extending substantially the length of the frame and integrally connected by a series of cross members, including members 20a, 20b, 20c, 20d and 20e, as shown. Frame members 18 are also interconnected by a butt plate 22 spanning the rear end 14a of the frame, i.e., the right end in FIGS. 1–4. Secured to either side of each main frame member a suitable distance forward from rear end 14a and extending downwardly therefrom is a pair of pivot plates 24 (FIGS. 1–3). A pivot pin 26 connects each pair of the pivot plates with a corresponding ear (not shown) extending downwardly from the rear end of chassis 12, pivotally mounting tilt frame 14 on chassis 12.

A pair of hydraulic cylinders 28 (one shown in FIGS. 1 and 2) are pivotally mounted at their lower ends on a pair of brackets 30 secured to the opposite outer sides of truck chassis 12. Each cylinder is pivotally attached at its upper end to one of the main frame members of tilt frame 14 about midway between the ends of the frame, as shown in the drawings. Thus, as should be apparent, tilt frame 14 can be raised from a horizontal position (shown in FIG. 1) to a fully inclined position shown in solid outline in FIG. 2, or to any desired intermediate position, and then returned to a horizontal position by operation of cylinders 28. The hydraulic power supply and operational controls for the cylinders are conventional and have been omitted from the drawings.

Figure 6:
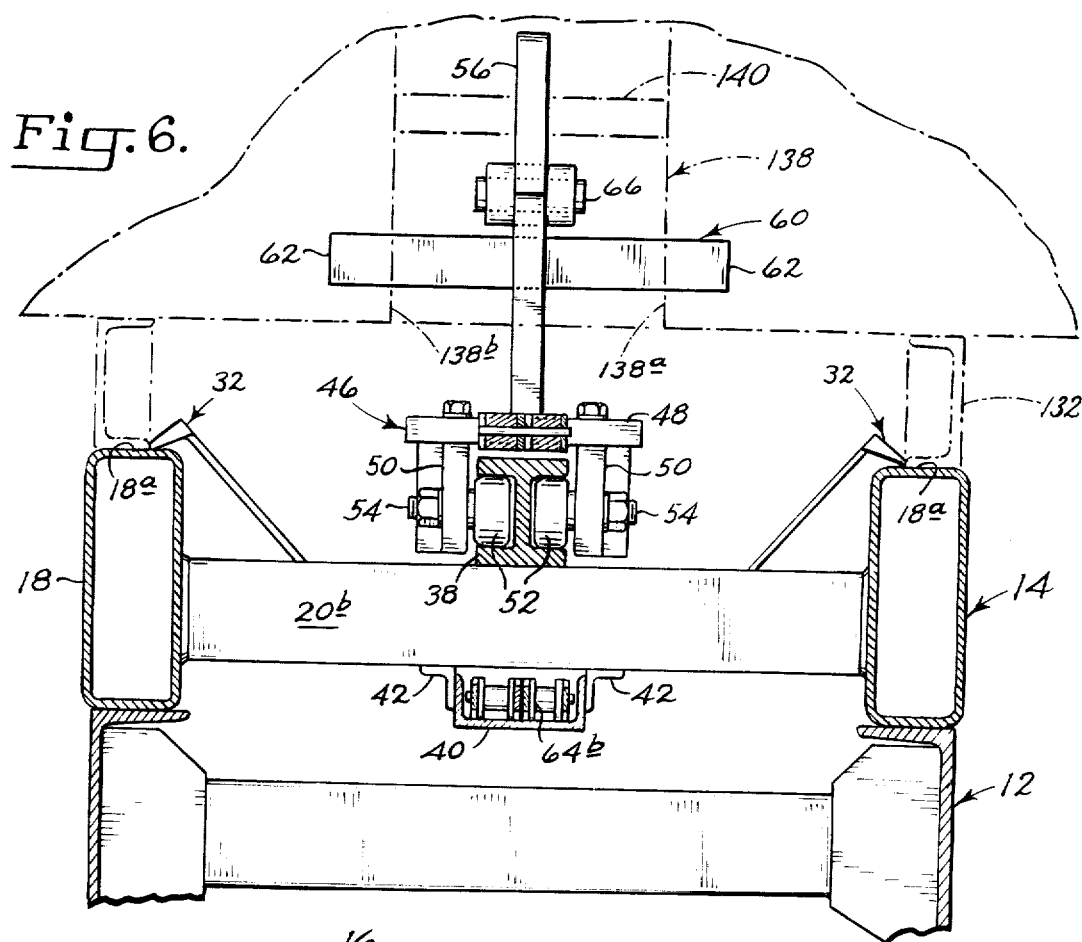
FIG. 6 is an enlarged sectional elevation on line 6—6 of FIG. 3, rotated 90°.

Referring now to FIGS. 3, 4 and 6, the main frame members of tilt frame 14 have a substantially rectangular cross-sectional configuration, best shown in FIG. 6, and include substantially flat, smooth top surfaces 18a. Each top surface 18a, extends longitudinally substantially the entire length of frame 14 and forms what may be termed a "skid surface" for accommodating sliding movement thereon of a portion of container 16, as presently will be described, with the surfaces together forming an elongate "skidway" for receiving and supporting container 16 on frame 14. Means for aligning a container laterally on the skidway are provided by a series of alignment assemblies 32. The assemblies are secured, as by welding, at longitudinally spaced intervals along surfaces 18a of the frame members, as best shown in FIG. 3.

Still referring to FIGS. 3, 4 and 6, tilt frame 14 also includes an elongate I-beam 38 extending substantially the length of frame 14 parallel to and substantially midway between frame members 18. Beam 38 is supported on and suitably attached, as by welding, to the top of the cross members. An elongate channel member 40 similarly extends substantially the length of the tilt frame directly under beam 38, suspended below the cross members on brackets 42 (FIG. 6).

As shown in FIG. 6, the channels extending along either side of I-beam 38 together form an elongate track mounting a carriage 46 for movement along frame 14.

As shown in FIGS. 3, 4 and 6, carriage 46 includes a top plate 48 to which are bolted a pair of laterally spaced, depending side walls 50, spaced, as shown in FIG. 6, a slight distance outwardly from the outer edges of beam 38. Each of the side walls carries a pair of rollers 52 disposed inwardly of the side walls and rotatably mounted on stub shafts 54 (FIG. 6) anchored to the side walls as shown. Suitably secured to top plate 48 and thus forming a part of carriage 46 is an upstanding, longitudinally extending center rib 56. As best shown in FIG. 4, the top rear portion of rib 56 is formed into a forwardly opening hook 58 which comprises first drive coupler means for truck 10. Extending out from either side of center rib 56 at the locations shown are a pair of cross ribs 62. The cross ribs are rigidly joined to the center rib and together form a horizontal push element or push plate 60, also comprising first drive coupler means for the truck.

Means for moving or driving carriage 46 back and forth along the track on frame 14 includes a length of double-width roller chain 64. One end of chain 64 is pivotally connected to the front of the carriage at 66 near the top forward edge of rib 56, as shown. The other end of the chain is similarly connected to a rearward-extending projection 68 from top plate 48 adjacent the lower rear edge of center rib 56. Thus, referring to FIGS. 3 and 4, chain 64 extends in a forward stretch 64a from point 66 toward the front of frame 14, passes around a dual drive sprocket 70 centrally mounted on a drive shaft 72 at the front end of the frame, then extends downward around forward idler sprocket 74. As best shown in FIG. 3, drive shaft 72 is journaled between a pair of upright mounting plates 75 attached to the top of frame members 18.

From sprocket 74, the chain extends in a return stretch 64b toward the rear of the frame, supported in channel 40 (FIG. 6), passes around a rear idler sprocket 76 centrally mounted on an idler roll 78 at the rear of frame 14, then extends along a rearward stretch 64c to its connection point on carriage 46. As shown in FIG. 3, idler roll 78 is journaled between a pair of longitudinally extending plates 80 spaced inwardly of frame members 18 and suitably attached to butt plate 22 and adjacent cross member 20a.

Referring again to FIGS. 3 and 4, the drive means for carriage 46 further includes a triple reduction chain drive system 82 comprising a pair of parallel, interconnected drive trains 84, 85. Each drive train includes a hydraulic drive motor suitably mounted, as by brackets 86, to the forward side of cross member 20c. Thus, describing drive train 84, drive motor 88 is coupled to a first intermediate shaft 90 by a roller chain 92, with suitable sprockets on the motor and intermediate shaft providing one stage of speed reduction. Shaft 90 is coupled to a second intermediate shaft 94 by a second roller chain 96, with suitable sprockets providing a second stage of speed reduction. Finally, the second intermediate shaft is coupled to previously mentioned drive shaft 72 by a third roller chain 98, with suitable sprockets providing a third stage of speed reduction. Similarly, drive motor 89 is coupled to drive shaft 72 via intermediate shafts 90, 94 by chains 93, 97 and 99. Drive motors 88, 89 are connected in parallel through hydraulic lines 100, 102 to suitable hydraulic fluid supply means (not shown) located on the truck. The fluid supply means is provided with the usual controls, including provision for reversible operation of the motors. Thus, as will be understood, carriage 46 may be moved either forward or rearward along its track on frame 14 by operating the drive motors in an appropriate direction.

Now referring to FIGS. 3–5, tilt frame 14 additionally includes a pair of elongate snubber assemblies 114, 115 mounted, as shown in the drawings, toward the rear end of the frame, outwardly of frame members 18. As shown in FIGS. 3 and 5, each snubber assembly is mounted in spaced, parallel relation to the frame members on a pair of spacers 116. Now describing the construction of a snubber assembly, it being understood that both assemblies are essentially alike, assembly 114 includes an elongate, horizontally disposed tubular body 118 of substantially rectangular cross section. An elongate opening or slot 119 extends forward along the top of body 118 a major portion of its length. Slidably received within body 118 is a guide 120 of similar cross-sectional configuration. Secured to the top of the guide and extending upward therefrom through slot 119, is a blade 122. Blade 122 includes a rearward facing notch 124 (FIG. 4) in its upper rear edge, with the blade and notch forming a "catch" for the snubber. Secured to the front end of guide 120 (the left end in the drawings) is a elongate rod 126. Rod 126 extends in a forward direction from the guide through an opening in the front end of plate 118a of body 118, as shown in FIG. 5. Captured in body 118 between end plate 118a and the front end of guide 120 is a compression spring 128 which, as will be understood, biases guide 120 and attached blade 122 toward the rear end of the snubber assembly.

Now describing detachable container 16, and particularly the features thereof which adapt the container for use with truck 10, container 16 comprises an elongate, rectangular body 130 (FIGS. 1, 2 and 6). Body 130 is provided with a pair of laterally spaced, parallel skid bodies or runners 132 which extend substantially the length of its bottom at equal distances inwardly from the sides of the container. As will be understood, the spacing between runners 132 is substantially the same as that between the portions of top surfaces 18a which form the previously mentioned skidway on frame 14. A ground wheel 134 is suitably mounted adjacent each bottom rear corner of body 130 spaced outwardly from runners 132. The wheels extend down below runners 132 and support the rear of the container as it rests on the ground, as well as during a part of the time when it is being loaded onto or unloaded from the truck. Container 16 is also provided with a pair of forward supports 136 which support the front end of body 130 when the container is entirely unloaded from the truck.

At its bottom front end, container 16 is provided with coupling means comprising a centrally disposed, open-front, open-bottom cavity 138 (FIGS. 1 and 6) having sidewalls 138a, 138b and rear wall 138c. An engageable coupling bar 140 is secured between sidewalls 138a, 138b, forward of rear wall 138c. The container is also provided with a pair of horizontally disposed snubber posts 142. One of the pair is mounted along either side of the container on a bracket 144 secured to the bottom of body 130 forward of wheel 134 and outwardly of runner 132 as shown in FIGS. 1 and 2.

The loading of container 16 onto truck 10 will be now described, starting from an entirely detached position with the container resting on the ground on wheels 134 and 136. Initially, carriage 46 is moved to the extreme rear end of tilt frame 14 (the position shown in dot-dashed outline in FIG. 4) by appropriate operation of carriage drive system 82. The frame is then tilted upward by extension of cylinders 28 to the position shown in solid outline in FIG. 2 wherein the rear end of hook 58 is close to the ground and at a lower level than the bar in cavity 138 of the container. With the frame so tilted, the truck is backed toward the front of container 16 until the back of hook 58 reaches the rear wall of cavity 138. The carriage drive system is then activated to move carriage 46 forward along its track, which causes hook 58 to engage bar 140.

With continued forward movement of the carriage, the front end of the container is lifted off the ground as shown in solid outline in FIG. 2. The tilt angle of frame 16 is gradually reduced as carriage 46 is moved forward (as shown in phantom outline in FIG. 2) so as to bring frame members 18 into line with runners 132 as the container is pulled off the ground onto the frame. Alignment assemblies 32 act to align runners 132 with frame 14 as the container is pulled along the skidway formed by the frame members top surfaces 18a. Finally, the frame is lowered to a horizontal position on the truck, and the container pulled to a final seated or carrying position illustrated in FIG. 1. As this position is approached, the container snubber posts engage the notches in blades 122 of the snubber assemblies, and further forward movement of the container is yieldably resisted by the snubbers.

With the container in its seated, carrying position, the rear end of the container is firmly held in place on frame 14 and kept from sliding forward on the frame by the snubber assemblies. The forward end of the container is held down on the frame and prevented from sliding to the rear by hook 58. Lateral shifting is prevented by alignment assemblies 32. Thus, the container is secured in place on the truck against inadvertent moving or shifting without any additional operation or locking device being required.

To unload or set off the container from the truck, the reverse procedure is followed, with the drive system reversed to move the carriage rearward along its track. With such movement, push plate 60 on the carriage engages the front container body 130 laterally outward of cavity 138, the area on either side of the cavity providing a broad pushing surface for the push plate. In this way, the pushing force is not concentrated in a small area, as in prior art designs which use the back of the hook to move the container during unloading.

As will be understood, the container is moved along the frame's skidway during loading and unloading under positive drive by carriage 46. The chains employed in the carriage drive system are substantially inelastic as compared with the cables used in prior art designs, and move the container in a direct, positive manner, reducing the jerky stick-slip motion experienced with cable systems. Moreover, the chain system is far less hazardous should breakage occur.

Thus, there is provided a novel truck and detachable container combination including a loading/unloading assembly which provides increased safety, durability, and lower maintenance. Although a preferred embodiment has been described herein, it is understood that variations and modifications are possible without departing from the spirit of the invention.

It is claimed and desired to secure by Letters Patent:

1. In the combination of a truck and detachable dropbox container, wherein the truck includes an elongate tiltable container-carrying frame, a laterally spaced pair of frame members extending substantially the length of the frame, each including an elongate skid surface which, together with the other member's skid surface, forms an elongate skidway for receiving and supporting the container, an elongate track disposed centrally of said frame members and extending substantially the length of the frame, a carriage mounted for movement on said track, first drive coupler means mounted on said carriage, power-operated, reversable chain drive means operatively connected to the carriage for moving it either forward or rearward on the track, said means being operable to shift the carriage from adjacent one end of the track to the other in an uninterrupted movement, a pair of shock-absorbing snubbers, each secured adjacent a different one of said frame members and disposed laterally outwardly of the frame, said snubbers each including a catch configured to engage a bottom portion of the container as the container is moved along said frame toward said carrying position, and spring means mounting the catch whereby the same is biased toward the rear of the frame, but yieldable toward the front of the frame upon engagement with said bottom portion, a pair of laterally spaced elongate skid bodies disposed along the bottom of the container, said bodies being engageable with and slidable along said skidway during movement of the container along the frame toward and away from a carrying position adjacent the forward end of the frame, second drive coupler means mounted on the container and drivingly engageable with said first drive coupler means, and means mounted on the container for engaging said snubbers as the container is moved forward along said frame toward said carrying position.

2. The combination of claim 1, wherein said first drive coupler means comprises a forward opening hook, and said second drive coupler means comprises means engageable by said hook to couple together said carriage and container for forward movement of the container along said frame toward said carrying position.

3. The combination of claim 1, wherein said first drive coupling means comprises a rigidly mounted push member, and said second drive coupling means comprises a substantially planar surface engageable by said member to couple together said carriage and container for rearward movement of the container along the frame away from said carrying position.

4. The combination of claim 1, wherein said chain drive means comprises a pair of parallel, positively interconnected multi-stage reduction drive trains, each powered by a different drive motor.

5. In a truck adapted for picking up, carrying, and setting off a drop-box container, where the container has a laterally spaced pair of elongate runners disposed along its bottom surface, an exposed, substantially horizontal coupling bar disposed adjacent the front of the container, extending transversly of the container's longitudinal axis, and a horizontally disposed snubbing post for each side of the container mounted on the container and projecting laterally outwardly thereof, the combination comprising an elongate tiltable container-carrying frame pivotally mounted adjacent the rear end of the truck's chassis and including a laterally spaced pair of frame members extending substantially the length of the frame and forming an elongate skidway for receiving the container's runners and supporting the same for slidable movement thereon toward and away from a carrying position on the frame during picking up and setting off of the container, a beam attached to the frame substantially parallel to and midway between said frame members, and extending substantially the length of the frame, a carriage mounted on said beam for movement therealong, power-operated chain drive means operatively connected to the carriage for moving it back and forth along the beam, an upstanding rib rigidly secured to the carriage and extending in a substantially vertically plane parallel to said beam, said rib including an integral forwardly opening hook portion configured to engage the container's coupling bar to pick up and pull the container along the skidway toward said carrying position, a horizontally disposed push member secured to and extending outwardly from either side of said rib, the rear margin of said member extending in a plane which is substantially normal to the longitudinal axis of said beam, said push member being adapted to engage the front end of said container and to push the container away from said carrying position and off of the frame, and a pair of snubbers, each one secured adjacent a different one of said frame members and disposed laterally outward of the frame, said snubbers each including a catch configured to engage a snubbing post as a container is moved into said carrying position, and spring means acting on each catch whereby the catch is spring biased toward the rear of the frame and is yieldable toward the front of the frame.

6. The truck of claim 5, wherein said chain drive means comprises a pair of parallel positively interconnected multi-stage reduction drive trains, each powered by a different drive motor.

7. In the combination of a truck and detachable drop-box container therefor, wherein the truck includes a tiltable container-carrying frame, means defining an elongate skidway on the frame for receiving and supporting the container thereon, skid means on the container engageable with said skidway for sliding therealong with movement of the container toward and away from a carrying position adjacent the forward end of the frame during on- and off-loading, respectively, of the container, first coupler means on the container, second coupler means on the truck, mounted for reciprocal movement along said frame and engageable with said first coupler means, reversible power-operated positive drive means on the truck operatively connected to said second coupler means for shifting the same under positive drive along the frame from adjacent one end of said skidway to the other, said drive means being operable to shift said second coupler means substantially the length of said skidway in a continuous motion, whereby a container having its coupler means engaged by said second coupler means is moved in a steady, uninterrupted manner along the skidway during on- or off-loading, and snubbing means separate from said drive means, mounted on said frame adjacent the skidway for yieldably engaging the container as such is moved into said carrying position by said drive means with said first and second coupler means drivingly engaged, said snubbing means includes a catch means configured to engage a bottom portion of the container as the container is moved along said frame towards said carrying position, and spring means mounting the catch whereby the same is biased towards the rear of the frame, but yieldable towards the front of the frame upon engagement with said bottom portion.

* * * * *